(12) United States Patent
Crook

(10) Patent No.: US 6,642,942 B1
(45) Date of Patent: Nov. 4, 2003

(54) METHOD AND SYSTEM FOR CONFIGURING AMONG CALL PROCESSING APPLICATIONS IN A CALL PROCESSING SYSTEM

(75) Inventor: John Crook, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 09/703,750

(22) Filed: Nov. 1, 2000

Related U.S. Application Data
(60) Provisional application No. 60/187,601, filed on Mar. 7, 2000.

(51) Int. Cl.[7] ............................................... G06F 13/00
(52) U.S. Cl. ........................................ 345/744; 345/764
(58) Field of Search ................................ 345/967, 835, 345/771, 839, 867, 970, 971, 975, 744, 764

(56) References Cited

U.S. PATENT DOCUMENTS

| | | | | |
|---|---|---|---|---|
| 6,141,724 A | * | 10/2000 | Butler et al. ................... | 711/11 |
| 6,353,446 B1 | * | 3/2002 | Vaughn et al. ............... | 345/733 |
| 6,366,300 B1 | * | 4/2002 | Ohara et al. ................. | 345/771 |

* cited by examiner

*Primary Examiner*—Cao (Kevin) Nguyen
(74) *Attorney, Agent, or Firm*—Blakely, Sokoloff, Taylor & Zafman LLP

(57) ABSTRACT

A method and system for configuring among call processing applications in a call processing system is provided. In particular, call processing applications are graphically represented in a GUI editor. The applications are configured with one another by graphically linking the applications together.

18 Claims, 17 Drawing Sheets

ID AND SYSTEM FOR
CONFIGURING AMONG CALL
PROCESSING APPLICATIONS IN A CALL
PROCESSING SYSTEM

CONTINUING APPLICATION DATA

This application is based upon, and claims the priority of, U.S. Provisional Application Ser. No. 60/187,601, filed Mar. 7, 2000 expired, invented by John Crook, and entitled TECHNIQUE OF CONFIGURING A CALL PROCESSING SYSTEM.

BACKGROUND OF THE INVENTION

1. Technical Field

The present invention generally relates to a method and system for configuring among call processing applications in a call processing system or call flow. More particularly, the present invention relates to the configuration among call processing applications using a Graphical User Interface (GUI) editor.

2. Background Art

Call processing systems have become highly prevalent in modern day society. Such systems typically involve a telephone caller dialing into a computerized integrated voice response (IVR) system and being presented with a menu of options. Each option corresponds to a particular Dual Tone Multiple Frequency (DTMF) digit, also known as a "touch tone" on the caller's telephone, thereby enabling the caller to select a desired option by pressing one of the touch tone keys on his/her telephone.

In operation, the call arrives over a public switched telephone network and is received by a server in the IVR system. The call is then connected to a particular application and analyzed by the server so that a particular group of resources required to process the call can be assembled. Typical resources include tone generators, speech recognition algorithms, echo cancellors, etc. The assembling, modification, and dissembling of call resource groups is well known in the art.

In existing systems, configuration among various applications in a call often require expert programmers to write code to hand-off or return the call groups from one application to another. This configuration process is both time consuming and expensive. The problems are compounded when the various applications are purchased from different vendors. This often requires modification of the applications so they can interface with one another in the call processing system.

In view of the above, there exists a need for a method and system to graphically configure among call processing applications in a call processing system. In addition, there is a need for such configuration to take place without users having to modify the applications.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
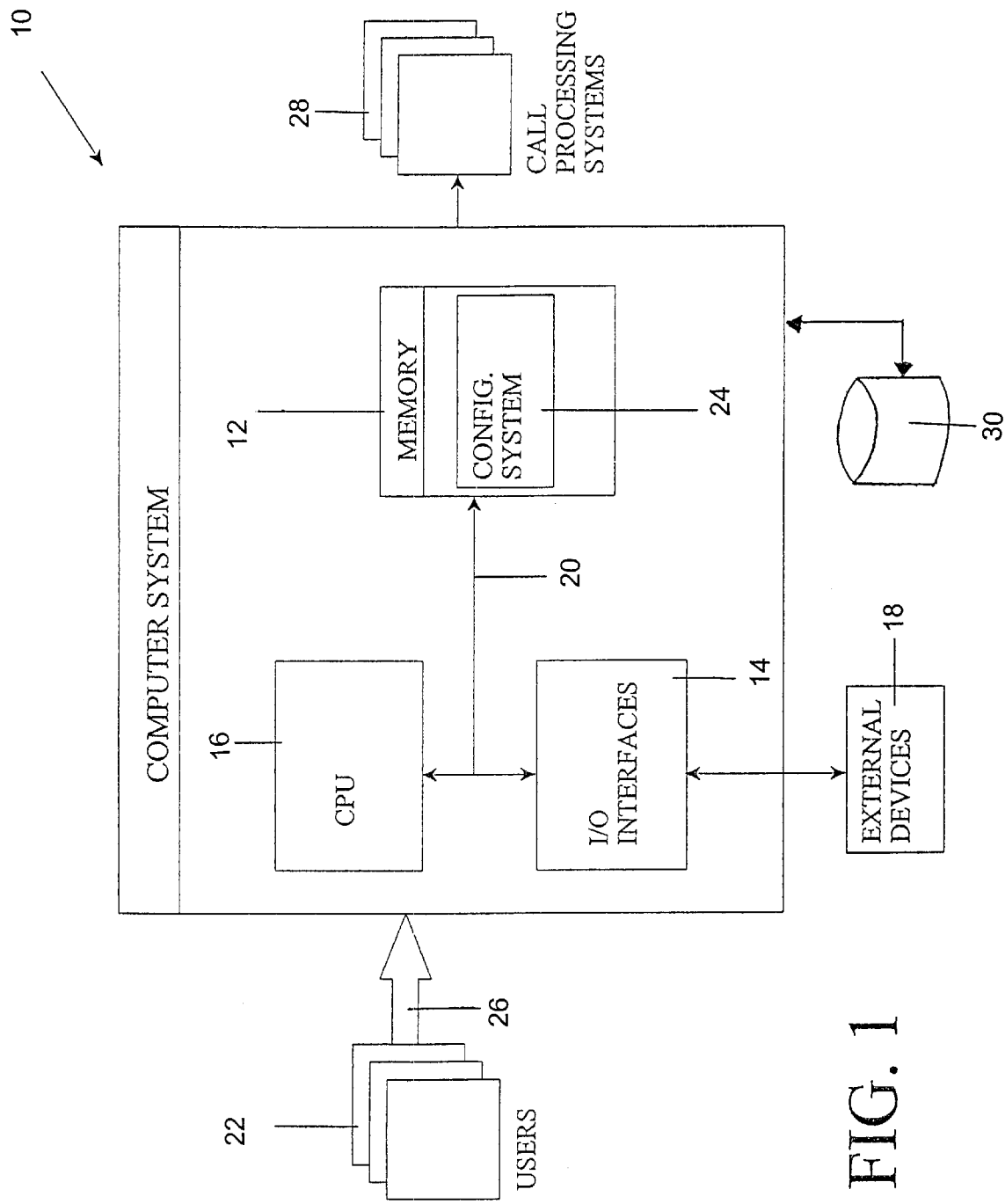
FIG. 1 depicts a block diagram of a computer system having a configuration system.

It is noted that the drawings of the invention are not necessarily to scale. The drawings are merely schematic representations, not intended to portray specific parameters of the invention. The drawings are intended to depict only exemplary embodiments of the invention, and therefore should not be considered as limiting the scope of the invention. In the drawings, like numbering represents like elements between the drawings.

DETAILED DESCRIPTION OF THE PREFERRED EMBODIMENT

The present invention overcomes the problems associated with existing systems by providing a method and system for configuring among call processing applications in a call processing system using a Graphical User Interface (GUI). In addition, the method and system of the present invention allow applications from different vendors to be configured with each other, without modification by users assembling the call processing systems.

According to a first aspect of the present invention, a method for configuring among a plurality of call processing applications in a call processing system is disclosed, comprising the steps of: (1) graphically representing each of the call processing applications in a GUI editor by positioning the applications in the GUI editor; and (2) automatically configuring between two of the applications by graphically linking the two applications in the GUI editor.

According to a second aspect of the present invention, a system for configuring among a plurality of call processing applications in a call processing system is disclosed, comprising: (1) a GUI editor in which each of the applications are graphically representable; (2) a positioning system for positioning the applications in the GUI editor; and (3) an automatic configuration system for configuring between two of the graphically represented applications in the GUI editor by graphically linking the two applications.

According to a third aspect of the present invention, a system for configuring among a plurality of call processing applications in a call processing system is disclosed, comprising: (1) a GUI editor for graphically representing the applications; (2) means for dragging the applications into the GUI editor; and (3) means for automatically configuring among two of the applications by graphically linking the two applications.

According to a fourth aspect of the present invention, a program product stored on a recordable media for configuring among a plurality of call processing applications in a call processing system is disclosed, comprising: (1) a system for graphically representing the applications by moving the applications from a menu into a GUI editor; and (2) a system for automatically configuring among two of the applications by graphically linking the two applications in the GUI editor.

The present invention allows a user to configure among applications of a call processing system (call flow) using a GUI whereby the applications are configured using drag and drop techniques and graphical connectors and indicators. This method and system eliminate the need for users assembling call processing systems to be expert programmers to configure among the applications thereof. Moreover, the method and system of the present invention allow for the applications to be interfaced with one another using standard initialization files. Accordingly, the need for users who assemble call processing systems to modify the applications is eliminated.

Referring now to FIG. 1, a server system 10 depicting the configuration system 24 of the present invention is shown. The server system 10 generally comprises memory 12, input/output interfaces 14, a central processing unit (CPU) 16, external devices/resources 18, and bus 20. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is configuration system 24 (shown in FIG. 1 as a software product, but not necessarily limited thereto). Configuration system 24 will be described in more detail below but generally comprises a method and system for configuring among call processing applications in a call processing system. Database 30 stores, among other things, the various call processing applications that are used in the call processing system and may comprise one or more storage devices, such as a magnetic disk drive or an optical disk drive. In another preferred embodiment, database 30 includes data distributed across, for example, a local area network (LAN), wide area network (WAN) or a storage area network (SAN) (not shown). Database 30 may also be configured in such a way that one of ordinary skill in the art may interpret it to include multiple databases.

A user 22 seeking to create and/or configure a call processing system (call flow) 28 will access the computer system 10 and the configuration system 24 via communications network 26, such as a direct terminal connected to the computer system 10, or via a remote workstation in a client-server environment. In the case of the latter, the client and server may be connected via the Internet, wide area networks (WAN), local area networks (LAN) or other private networks. The server and client may utilize conventional token ring connectivity for WAN, LAN, or other private networks, or Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

Once the user 22 has gained access to the configuration system 24, the user 22 can utilize a GUI to create and configure the call processing system 28. It is understood that the present invention can be realized in hardware, software, or a combination of hardware and software. As indicated above, the server system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suitable. A typical combination of hardware and software could be a general purpose computer system with a computer program that, when loaded and executed, controls the server system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material document.

Figure 2:
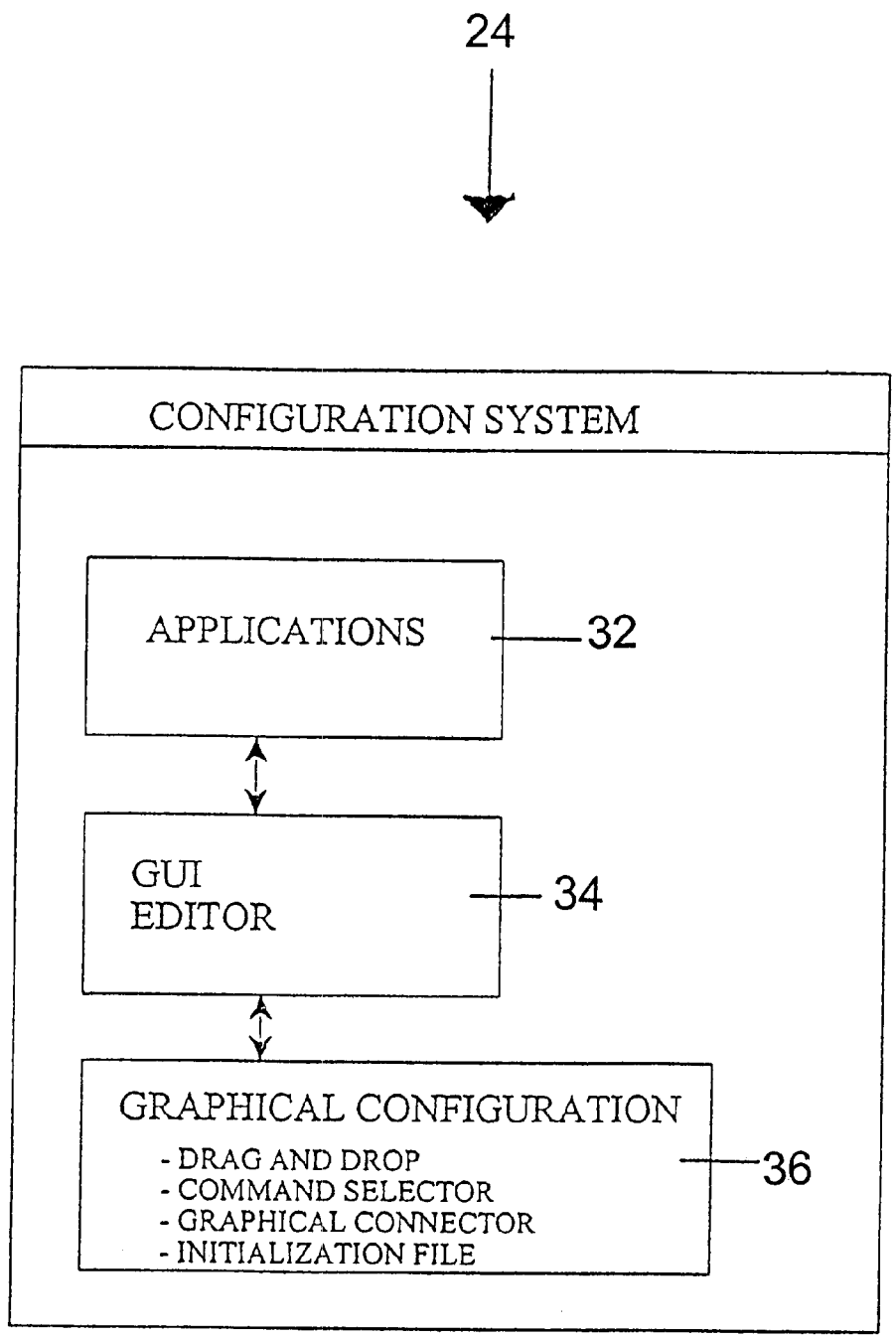
FIG. 2 depicts a block diagram of the configuration system of FIG. 1.

Referring now to FIG. 2, the configuration system 24 is shown in greater detail. A call processing system is configured by interfacing various applications with one another. To accomplish this, application files from an application system 32 are graphically positioned into a GUI editor system 34. This is preferably accomplished using drag and drop techniques in a file managing program, such as Windows Explorer. Dragging and dropping allows the user to easily place the applications in any order or position within the GUI editor system 34. It should be understood, however, that other techniques for positioning applications within the GUI editor system 34 can be implemented. For example, the application files can be copied and pasted from the application system 32 into the GUI editor system 34.

Once positioned in the desired locations, the applications must be configured with respect to one another. That is, the flow of the call processing must be defined by configuring the system in such a manner that control of the call is passed in accordance with a desired script and in response to commands and data that may be entered by a participant in the call being processed. This is also preferably accomplished graphically via graphical configuration system 36. Specifically, if the user desired to configure a first application with respect to a second application, he/she would first select a caller command from a list of presumed caller commands. The list of presumed caller commands, in one exemplary embodiment, is a list of DTMFs representing the various tones available to callers on a touch tone telephone. Once the user has selected the desired DTMF, the first application would be graphically linked to the second application using a graphical/visual connector (e.g., an arrow connector). Once linked, the call processing system is configured to hand-off a call from the first application to the second application upon designation of the selected command by the caller.

This graphical configuration system allows user to more easily create and configure call processing systems. No complex code is required to be written, and the user need only be aware of the call processing script which is desired to be executed. By implementing the graphical system of the present invention, users need only be familiar with basic computer functions, such as drag and drop techniques and mouse manipulation.

The present invention also solves the problem of utilizing software applications from different vendors in connection with one another. As long as the initialization files are maintained to a predefined standard, such applications, even if entirely independent of each other, may pass control to one another. Initialization is the process of locating and using defined values for variable data that is used by a computer program. For example, an operating system or application program is installed with default or user-specified values that determine certain aspects of how the system or program is to function. Often, these values are stored in initialization files. When the operating system or an application program is first loaded into the computer's memory, part of the program performs initialization—that is, it looks in the initialization files, finds the definite values to substitute for the variable values, and acts accordingly. For example, in a Windows environment, the desktop appearance and application programs that are to be started along with the operating system are identified and loaded.

For the present invention, a common interface among applications is achieved using initialization files for each application. Thus, the applications need only obtain run-time configurable parameters from Windows initialization files (i.e., an .ini file) stored with the application files, to interface with one another. Accordingly, applications from different vendors can be used without having to modify and possibly corrupt the call processing applications.

For example, the initialization files may contain information regarding the zip code of the caller requesting information about a local weather forecast the initialization file may also contain the network address of the server that maintains the weather data. As long as the application is configured to seek out the inputs it needs from a standard format file/information source in the initialization files, the application may work in conjunction with other applications written by other vendors.

Figure 3:
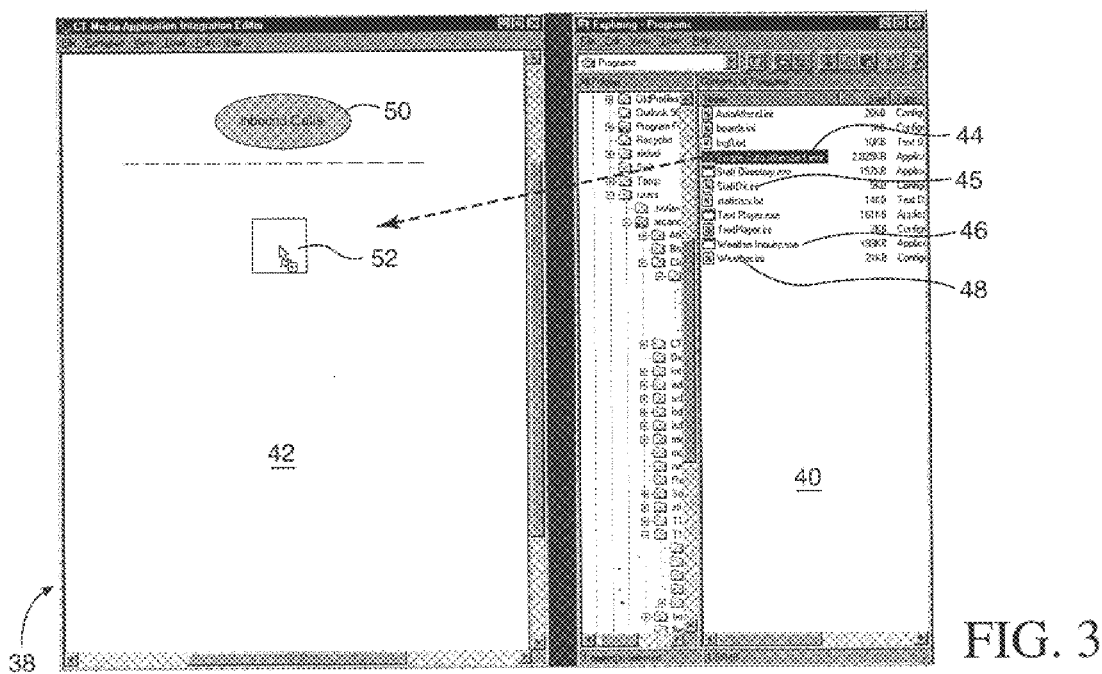
FIG. 3 depicts an example of first GUI.

FIG. 3 show an example of a GUI 38 according to the present invention. As depicted, GUI 38 includes file window 40 and GUI editor 42. File window 40 includes a menu of application files and initialization files that are implemented to assemble a call processing system or call flow. For example, file window 40 can include, inter alia, auto attendant application file 44, staff directory initialization file 45, weather inquiry application file 46 and weather inquiry initialization file 48. To assemble and configure a call processing system, the user will select the files corresponding to the desired applications and drag and drop the files in the GUI editor window 42. As shown, the user has selected the auto attendant application file 44 first. Upon dragging and dropping the file in a desired location, the auto attendant application 52 is inserted into the call processing system. The inbound call application 50 is used to receive all calls introduced into the call processing system and assemble the necessary groups of resources needed to process the call. Once the call groups have been assembled, they are handed-off from the inbound call application 50 to the auto attendant application 52. The auto attendant application 52 provides callers with what is commonly referred to as a main menu.

Figure 4:
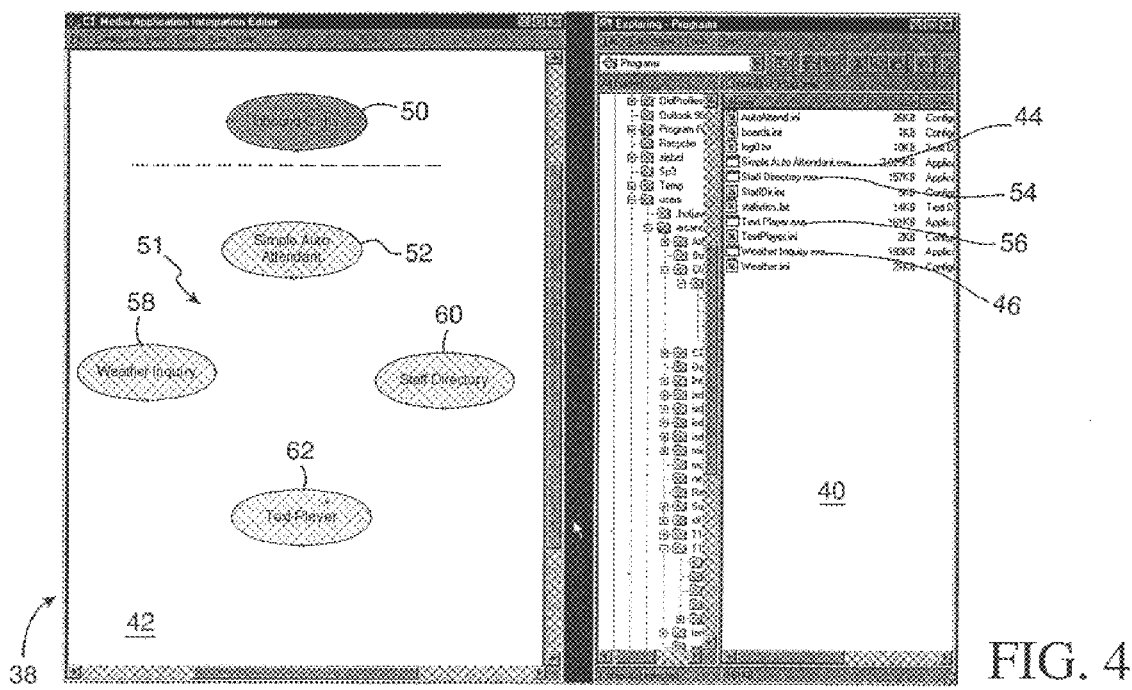
FIG. 4 depicts an example of second GUI.

FIG. 4. depicts a call processing system 51 as assembled by the user. Specifically, the user has selected the auto attendant 52, weather inquiry 58, staff directory 60 and text player 62 applications. As indicated above, this was accomplished by selecting the corresponding files 44, 46, 54 and 56 in the file window 40 and dragging and dropping the files 44, 46, 54 and 56 in the locations shown in the GUI editor 42. Once the applications have been positioned within the GUI editor 42, the user must now configure the applications among one another. As will be described in further detail below, configuration among/between the applications will be accomplished graphically. The graphical positioning and linking of the configuration causes a call processing script to be constructed.

Figure 5:
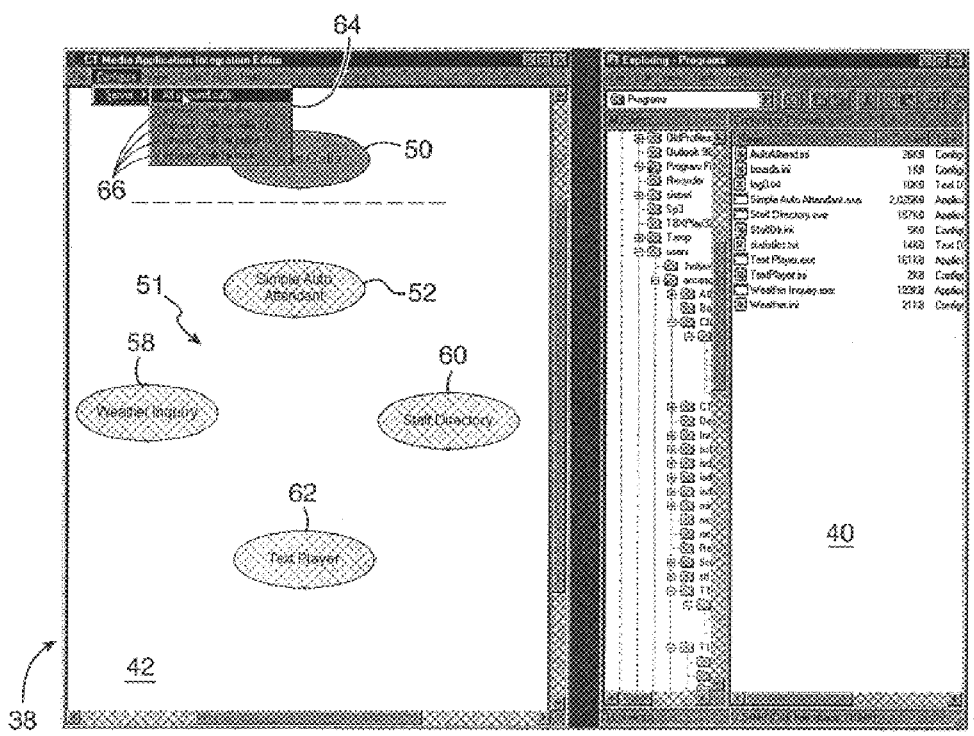
FIG. 5 depicts an example of third GUI.

FIG. 5 shows how the inbound call application 50 can be configured to handle inbound calls. As depicted, the user will configure the inbound call application by selecting the desired configuration option from the pull-down configuration menu 63. In this example, the user has selected the all inbound call option 64. Accordingly, all inbound calls will be handled by this particular inbound call application 50. In some cases it may be desirable for the inbound call application 50 shown in call processing system 51 to handle only inbound calls between certain times of the day or based on the identity of the caller. To configure the inbound call differently, the user may select from the other options 66 within the configuration menu 63.

Figure 6:
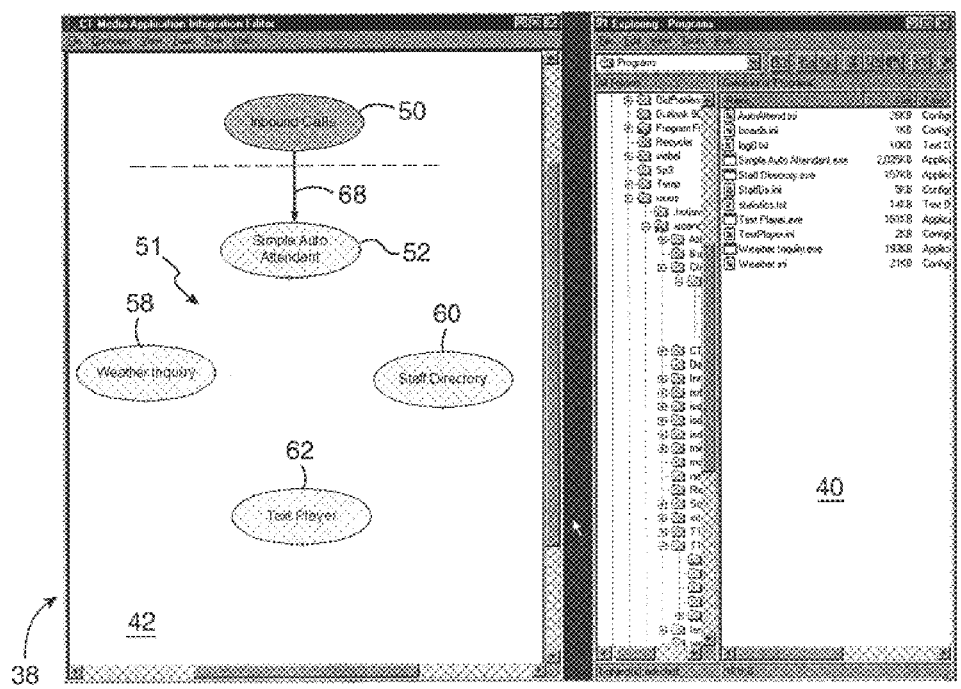
FIG. 6 depicts an example of fourth GUI.

Referring to FIG. 6, once the inbound call application 50 has been configured to handle inbound calls, it must be configured with another application so that the calls (call groups) can be processed through the call processing system 51. In most cases, including the example shown in FIG. 6, the inbound call application will hand-off the call to the auto attendant application 52, where callers will be presented with a menu of options they can navigate through using the DTMFs on their telephone's touch tone keypad. To configure the hand-off to the auto attendant application 52, the user will connect the inbound call application 50 to the auto attendant application 52 using a graphical or visual connector 68. Preferably, the graphical connector 68 is an arrow or the like that demonstrates the flow of a call through the call processing system 51. Moreover, the graphical connector 68 is preferably drawn by clicking on the connector 68 and dragging it to the appropriate application (i.e., the auto attendant application 52).

Figure 7:
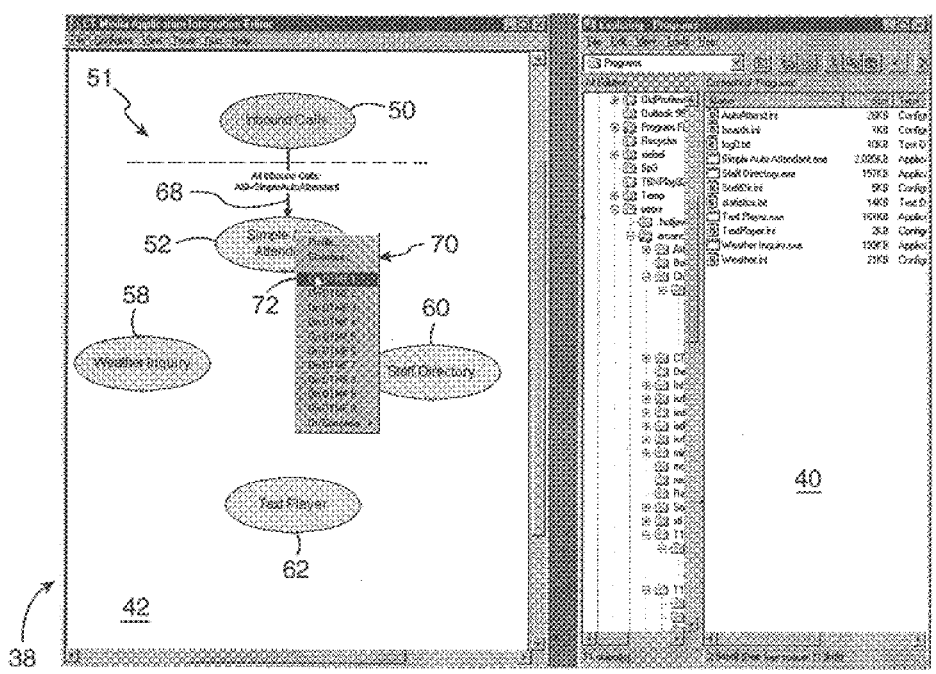
FIG. 7 depicts an example of fifth GUI.

After the inbound call application 50 has been configured to the auto attendant application 52, the auto attendant application 52 must be configured. FIG. 7 depicts one configuration of the auto attendant application 52. In particular, once a call is handed-off to the auto attendant application 52, a menu of application options will be presented to the callers. Accordingly, the various applications 58, 60 and 62 shown in GUI editor 42 must be assigned a DTMF that is based on a possible/presumed command of a caller (i.e., a possible DTMF entry by a caller). To configure the auto attendant application 52 with another application, the user will access the application menu 70 for the auto attendant application 52. Preferably, this is accomplished by right-clicking the mouse on the auto attendant application 52 in the GUI editor. However, those skilled in the art will appreciate that numerous ways to access the application menu 70 can be implemented. From the application menu 70, the user can select a presumed command (i.e., DTMF) from a list of presumed commands that callers may make/ choose from. Specifically, a caller's telephone may have a numeric keypad with numbers ranging from 0–9. These numbers represent the possible or presumed commands that callers may make. As shown in FIG. 7, the user has selected the presumed command DTMF 1 72.

Figure 8:
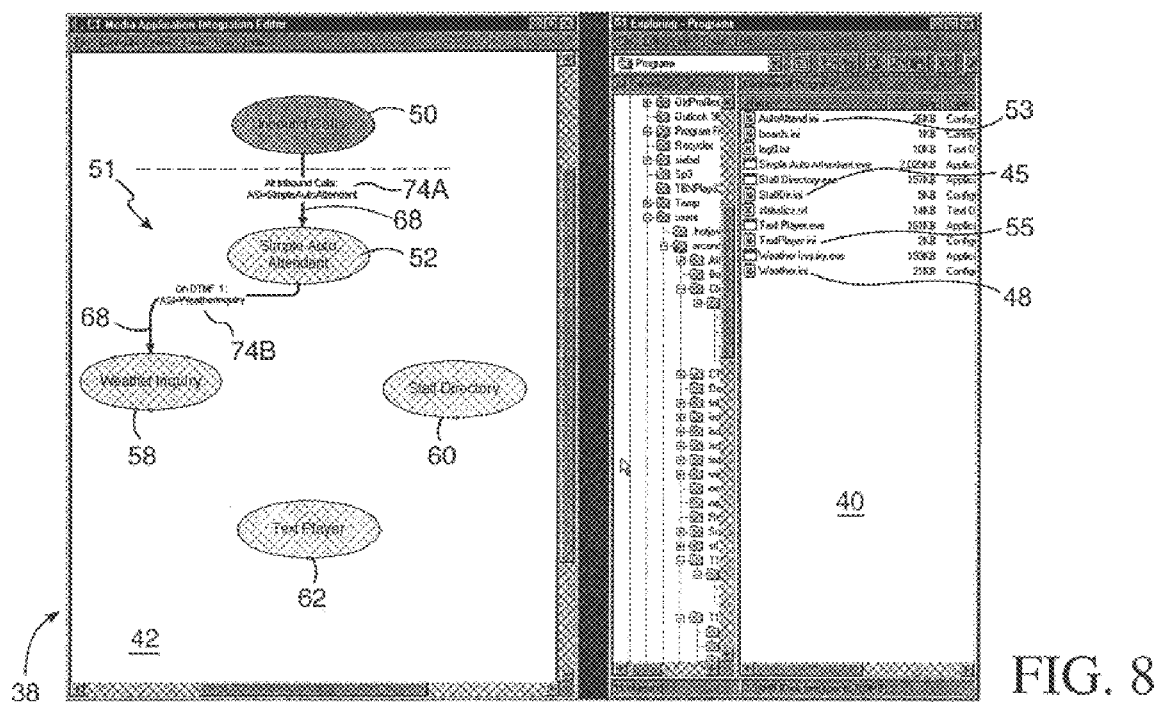
FIG. 8 depicts an example of sixth GUI.

Once a presumed command has been selected, the user must now connect the auto attendant application 52 with another application to correspond the selected command with a specific application in the call processing system 51. FIG. 8 shows that the weather inquiry application 58 has been corresponded by the user with the selected command DTMF 1. This was accomplished in a manner similar to the configuration of the inbound call application 50 with the auto attendant application 52. In particular, a visual or graphical connector is drawn using click and drag techniques to connect the two applications 52 and 58 together. Also shown in the GUI 42 editor are informational messages 74A and 74B to remind the user how the applications have been configured.

The auto attendant application 52 and the weather inquiry application 58 are now configured among each other without having modified the application files themselves. As explained above, incompatibilities among applications can be overcome by using initialization files 45, 48, 53 and 55 that are stored with the application files in the file window 40. For example, the weather inquiry initialization file 48 ensures that the weather inquiry application 58 has an interface that is compatible with a common application interface. Accordingly, the initialization files act as an adapter so that applications having different interfaces (e.g., applications that are from different vendors) can be interfaced with one another without modifying the application files themselves. Instead, the initialization files act as the technique of inputting the relevant data into the application.

Figure 9:
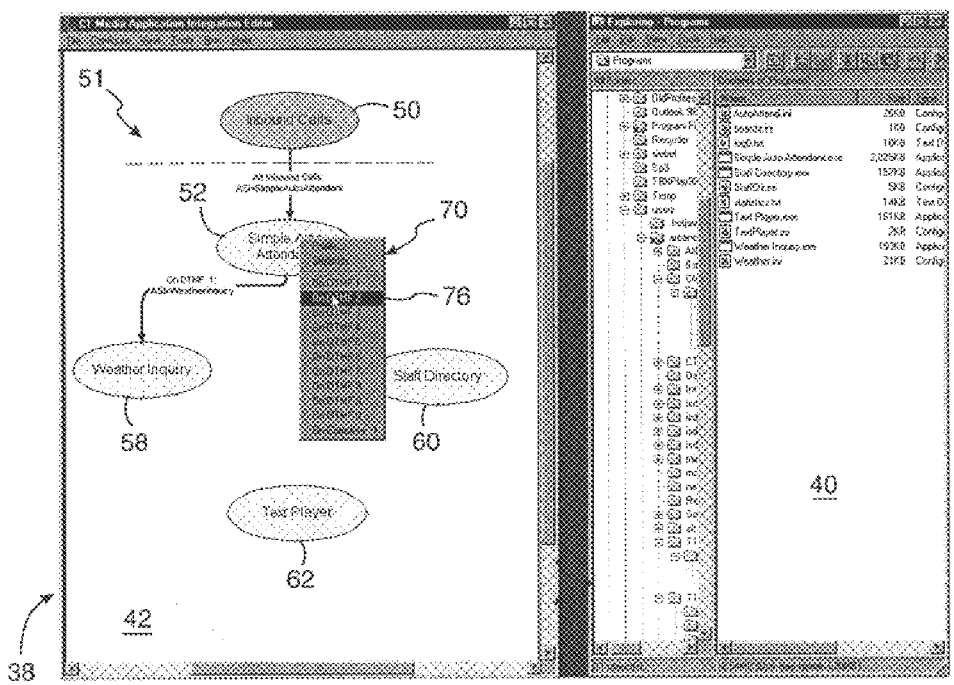
FIG. 9 depicts an example of seventh GUI.

FIG. 9, shows the further configuration of the auto attendant application 52. Once again, the application menu 70 is accessed to display the list of presumed caller commands (DTMFs). The user will select a particular command and then correspond the selected command to a particular application by connecting the two. In the example shown in FIG. 9, the user has selected DTMF 2.

Figure 10:
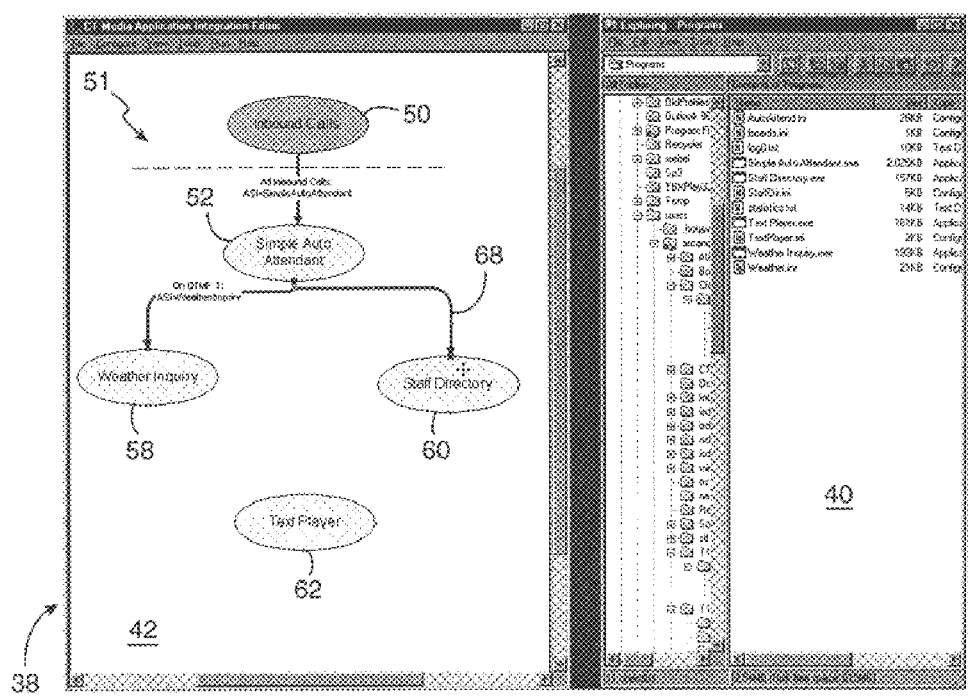
FIG. 10 depicts an example of eighth GUI.

Referring now to FIG. 10, DTMF 2 is shown as being corresponded to the staff directory application 60. Similar to the above connections, the auto attendant application 52 is connected to and configured with the staff directory application 60 via a graphical or visual connector 68. In particular, the user will click on the connector 68 at the auto attendant application 52 and drag it to the staff directory application 60. Based on the configuration for the auto attendant application 52 described herein, a caller will be presented with a menu of options, wherein by selecting DTMF 1 on their telephone keypad their call will be handed-off to the weather inquiry application 58, and by selecting DTMF 2, their call will be handed-off the staff directory application 60. The functionality of the particular applications depicted in the GUI editor is not intended to be limiting. For example, with respect to the weather inquiry application 58, a caller may obtain weather for a particular geographical location by entering a zip code for the desired location on their DTMF keypad. Moreover, the staff directory application 60 can present the caller with staff information upon entry of particular staff person's name on the DTMF keypad.

Figure 11:
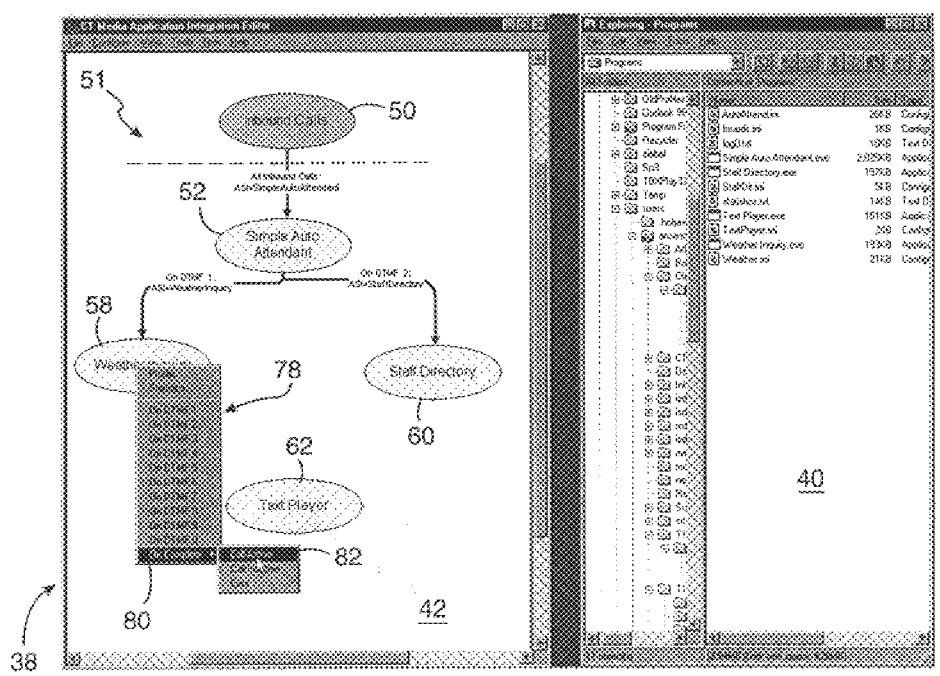
FIG. 11 depicts an example of ninth GUI.

FIG. 11 shows the configuration of the weather inquiry application 58. Similar to the configuration of the auto attendant application 52, the user will access the application menu 78 for the weather inquiry application 58 and be presented with both a list of presumed caller commands and a list of options for handling the call once the weather inquiry application 58 has completed its programmed tasks. In the example shown, the user is configuring the weather player application 58 upon completion of its programmed tasks. Specifically, the user has selected the on complete option 80 from the application menu 78. The user then selected the call active option 82 from the menu. This will allow the user to configure the weather inquiry application 58 in the event the application 58 has completed its programmed tasks (as opposed to a caller hanging up). For example, the caller has entered a zip code corresponding to a particular geographic location upon being prompted by the weather inquiry application 58.

Figure 12:
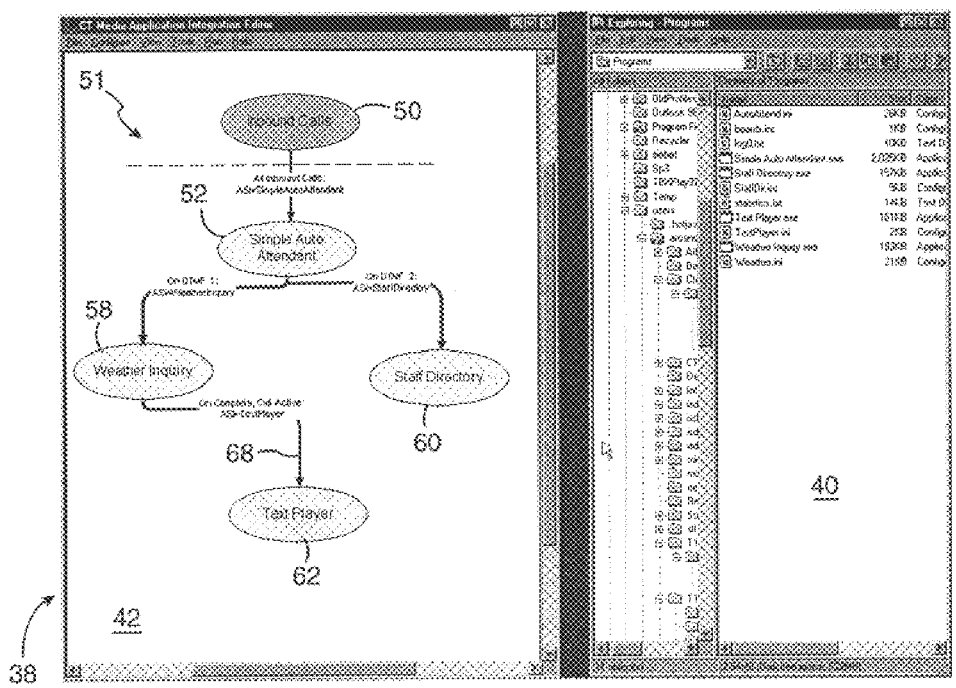
FIG. 12 depicts an example of tenth GUI.

As shown in FIG. 12, the user has corresponded the call active option 82 with the text player application 62 by connecting the weather inquiry application 58 thereto using graphical connector 68. A likely scenario for this configuration is that the caller will enter the zip code for the particular geographic region and the weather inquiry application 58 will retrieve textual weather information corresponding thereto. The call will then be handed-off to the text player that will play the retrieved information.

Figure 13:
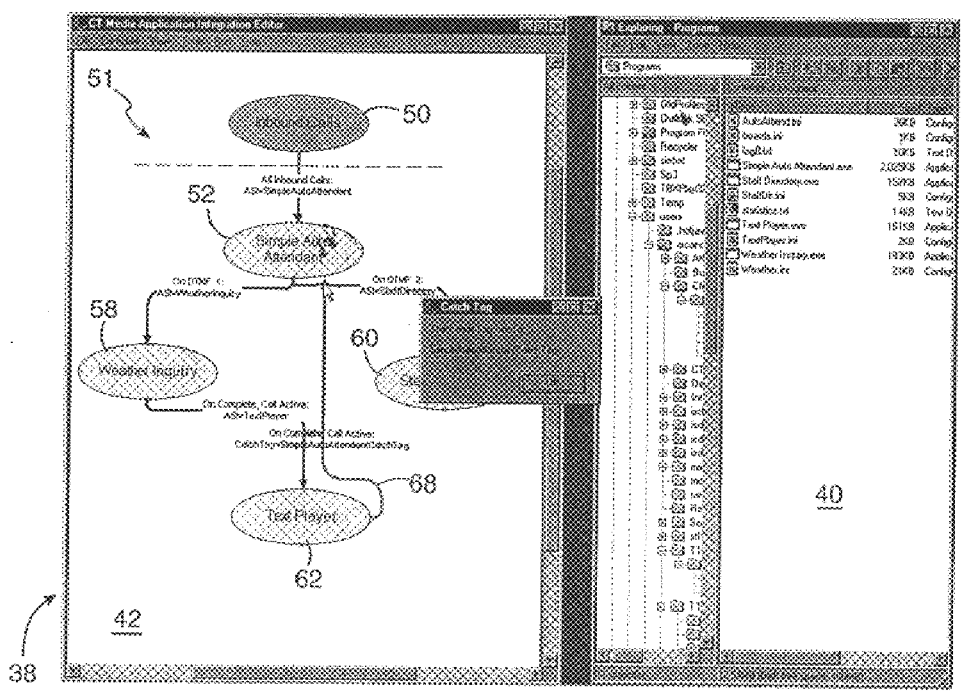
FIG. 13 depicts an example of eleventh GUI.

FIG. 13. shows how the call will be handled after the retrieved weather information has been played to the caller. Specifically, by dragging another graphical connector 68, the user can set specific instructions for call return upon completion of weather text reading. This can be used to override any default return instructions stored in the system. For example, default behavior might dictate that upon completion, an application must return a call to the application that handed the call to it. In such a case, upon completion, the call would be returned to the weather inquiry application 58 where the caller would be prompted enter another zip code on their telephone keypad. However, by selecting a "call active" option from a text player application menu (not shown), and then by connecting the text player application 62 to the auto attendant application 52, the call is instead returned to the auto attendant application 52.

Figure 14:
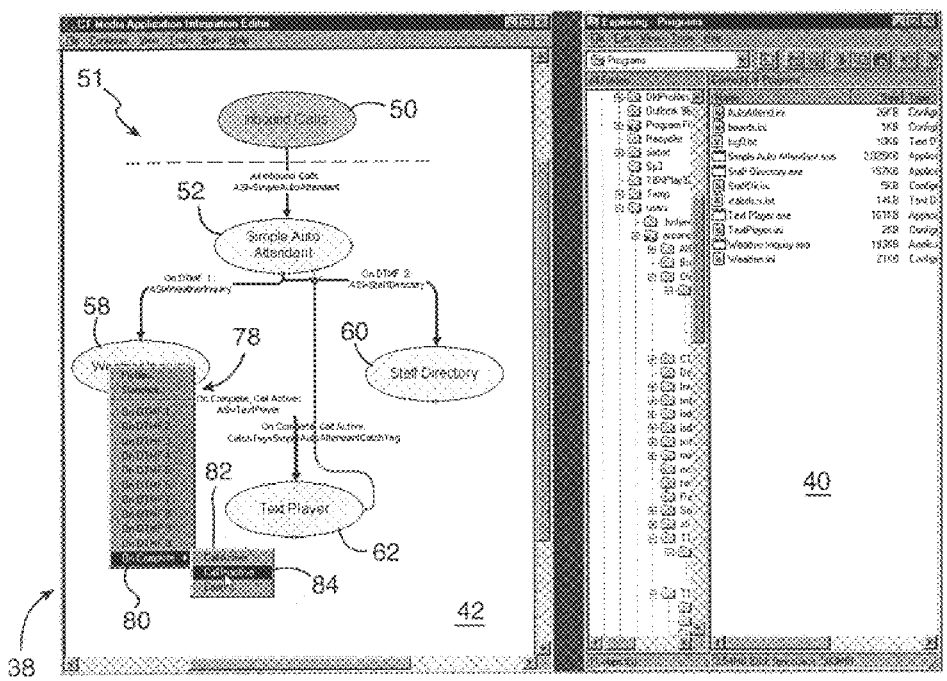
FIG. 14 depicts an example of twelfth GUI.

FIG. 14 shows the configuration of the weather inquiry application 58 in the event a caller hangs up. In particular, the user will access the weather inquiry application menu 78 and select the on complete option 80. However, this time, the user will select the call inactive option 84, instead of the call active option 82 selected in FIG. 11. The difference between the two options is that with the call active option 82, the caller has not hung up, rather, the application has completed its programmed tasks. In contrast, with the call inactive option 84, the user can configure the call processing system 51 to behave a certain way when the caller has hung up.

Figure 15:
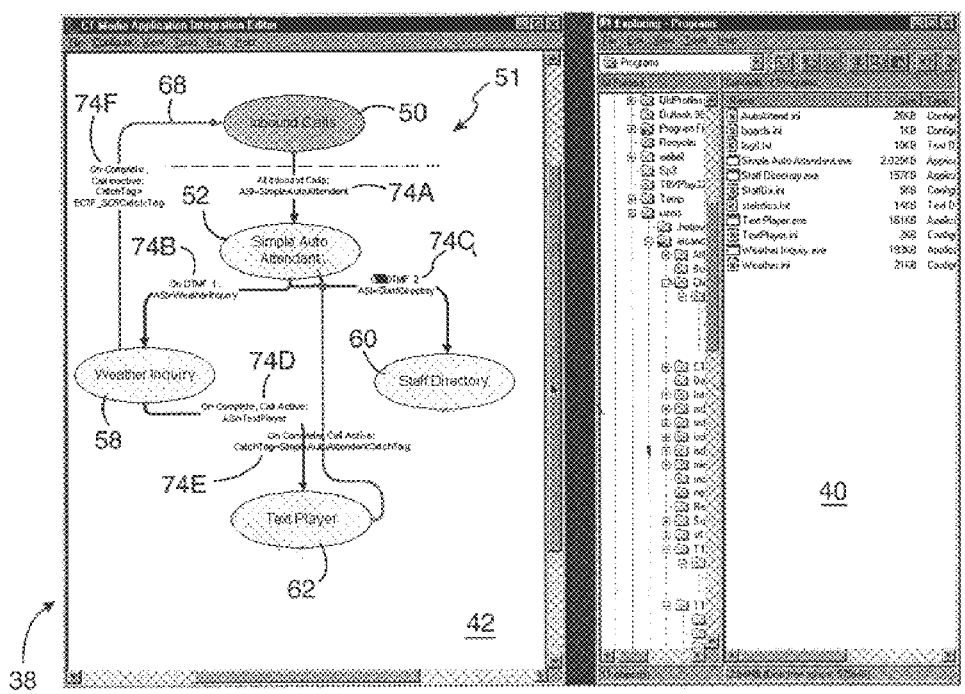
FIG. 15 depicts an example of thirteenth GUI.

FIG. 15 shows that the user has corresponded the call inactive option 84 with the inbound call application 50 by dragging a graphical connector 68 to connect the two applications 58 and 50. As indicated, default behavior might dictate for a call to be returned to the application from which it came. In this case, the call would have been returned to the auto attendant application 52. However, by configuring the weather application differently, the user is able to override the default and return the call to the inbound call application 50.

As further shown in FIG. 15, informational messages 74A–74E are shown in GUI editor 42 to indicate to the user how the call processing system 51 is configured. As shown, message 74A indicates that all inbound calls will be handed-off to the auto attendant application 52. Messages 74B and 74C indicate that a caller can choose between the weather inquire application 58 or the staff directory application 60 by selecting DTMF 1 or 2, respectively. Message 74D shows that upon completion of programming tasks by the weather inquiry application 58, the call will be handed-off to the text player application 62, in deviation of default behavior to return the call to the auto attendant application 52. Message 74E indicates that upon completion by the text player application 62 of verbalizing the requested weather information, the call will be returned to the auto attendant application 52. Lastly, message 74F shows that when caller hangs up at the weather inquiry application 58, the call will be returned to the inbound call application 50. Once the user has configured the call processing system 51 as desired (and verified by the informational messages 74A–74F), the configuration process is completed by selecting the run option 90 from the menu bar 92. This will allow the designed configuration to be run as a call processing system.

Figure 16:
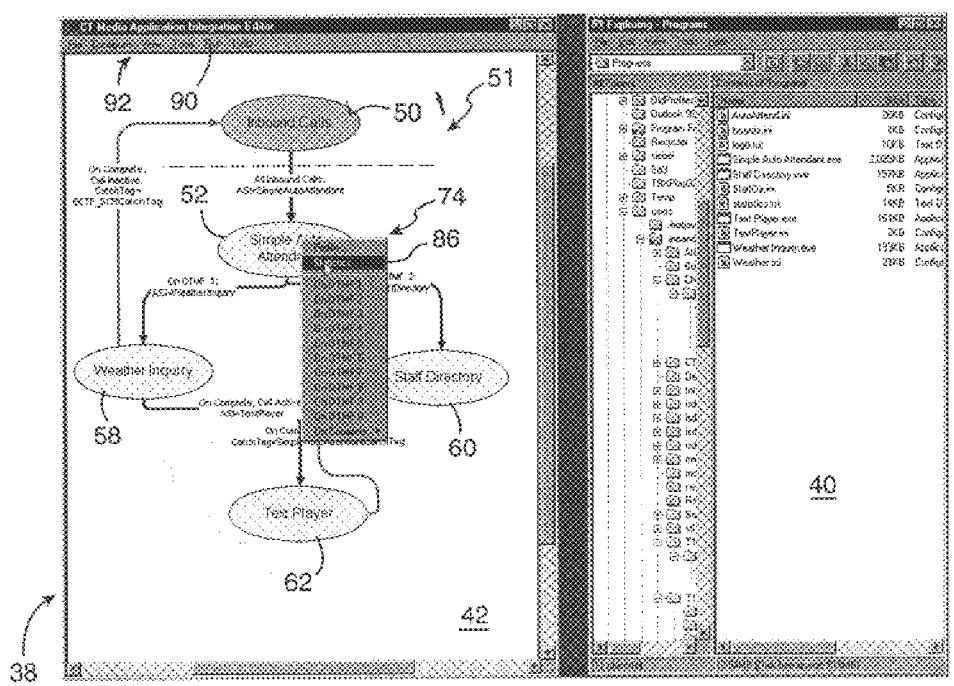
FIG. 16 depicts an example of fourteenth GUI.
Figure 17:
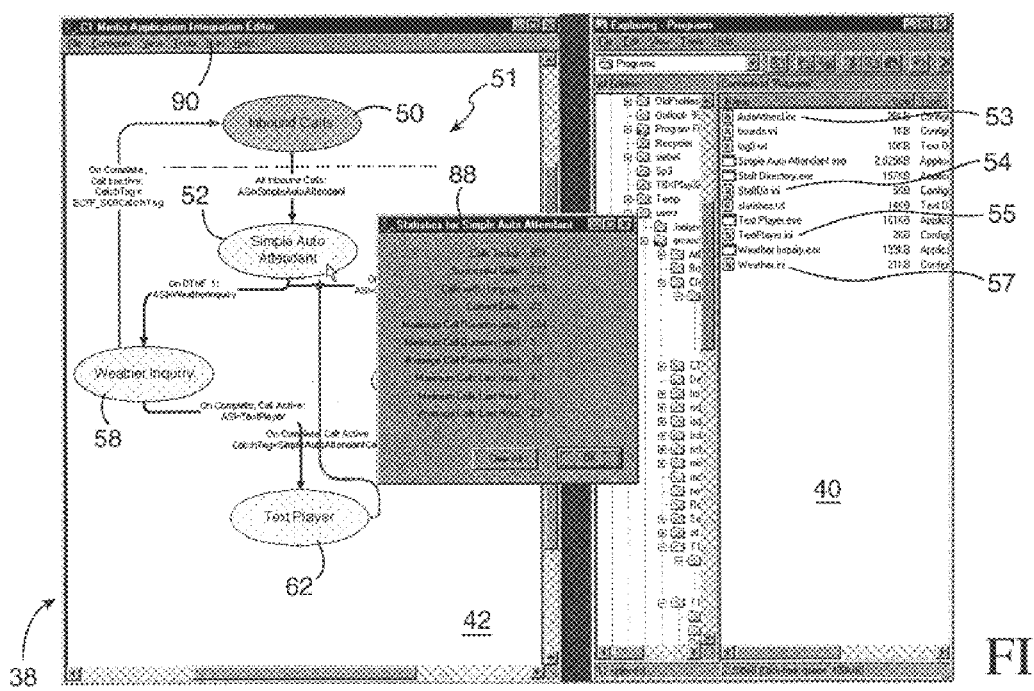
FIG. 17 depicts an example of fifteenth GUI.

FIG. 16 shows that users can also access call statistics for each application. For example, if the user desired to view call statistics for the auto attendant application 52, he/she would access the auto attendant application menu 74 and select the statistic option 86. Then, as shown in FIG. 17, a statistic window 88 would be displayed showing statistics of all calls handled by the auto attendant application 52. Examples of statistics include, among others, total number of calls, total number of caller hang-ups and average call duration.

The graphical configuration among the applications of the present invention substantially reduces the time and expense of assembling a call processing system 51. By implementing the teachings of present invention, users assembling call processing systems 51 are not required to be expert programmers. In contrast, anyone who is familiar with dragging and dropping techniques and mouse manipulation can practice the present invention, even when the applications are written by different vendors.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method comprising:
   receiving a selection of one or more call processing applications to be configured based on drag and drop operations from a menu of applications;
   graphically representing the selected applications in a Graphical User Interface (GUI) editor;
   receiving a selection of one or more configurations from a menu of configuration options for each selected application;
   configuring the selected applications based on the selected configurations;
   receiving a selection of one or more associations between the selected applications;
   linking one or more of the selected applications to each other based on the selected associations;
   graphically displaying the linked configurations of the selected applications; and
   constructing one or more scripts to implement the linked configuration.

2. The method of claim 1, wherein receiving a selection of one or more call processing applications to be configured based on drag and drop operations from a menu of applications comprises receiving a selection of one or more call processing applications to be configured based on a user's drag and drop operations from a menu of applications into the GUI editor.

3. The method of claim 1, wherein receiving a selection of one or more configurations from a menu of configuration options for each selected application comprises displaying a pop-up window representing a plurality of caller commands and receiving a selection of one or more of the plurality of caller commands.

4. The method of claim 1, wherein receiving a selection of one or more associations between the selected applications comprises receiving a selection of one or more of a plurality of caller commands and a selection of one or more applications to which each selected caller command will be linked by configuration.

5. The method of claim 1, further comprising running the selected applications in a call processing system to configure the selected applications according to the linked configuration and displaying configuration code upon completion of the configuration.

6. The method of claim 1, wherein each selected application has an associated initialization file and wherein configuring the selected applications based on the selected configurations comprises configuring the initialization files associated with the selected applications based on the selected configurations.

7. The method of claim 1, further comprising receiving a request for call statistics for a selected application and displaying statistics of all calls handled by the selected application.

8. An apparatus comprising:
   a Graphical User Interface (GUI) editor to graphically represent a plurality of call processing applications selected by a user for configuration using drag and drop operations from a menu of applications and to graphically represent a linked configuration between the selected applications chosen by the user; and
   a configuration element to configure between two or more of the graphically represented applications in the GUI editor based on the chosen linked configuration and to construct one or more scripts to implement the linked configuration.

9. The apparatus of claim 8, further comprising a positioning element to position the selected applications in the GUI editor based on the user's drag and drop operations from the menu of applications into the GUI editor.

10. The apparatus of claim 8, wherein the configuration element comprises a command linker to associate one of a plurality of caller commands selected by the user to one or more selected applications.

11. The apparatus of claim 8, wherein the call processing applications have corresponding initialization files and wherein the configuration element to configure the selected applications comprises the configuration element to configure the initialization files of the selected applications based on the selected linked configuration.

12. The apparatus of claim 8, further comprising a statistics manager to generate and display call statistics for selected applications.

13. An article of manufacture comprising:
   a machine accessible medium including content that when accessed by a machine causes the machine to:

receive a selection of one or more call processing applications to be configured based on drag and drop operations from a menu of applications;

graphically represent the selected applications in a Graphical User Interface (GUI) editor;

receive a selection of one or more configurations from a menu of configuration options for each selected application;

configure the selected applications based on the selected configurations;

receive a selection of one or more associations between the selected applications;

link one or more of the selected applications to each other based on the selected associations;

graphically display the linked configurations of the selected applications; and construct one or more scripts to implement the linked configuration.

14. The article of manufacture of claim 13, wherein the machine accessible medium including content that when accessed by the machine causes the machine to receive a selection of one or more call processing applications to be configured based on drag and drop operations from a menu of applications comprises machine accessible medium including content that when accessed by the machine causes the machine to receive a selection of one or more call processing applications to be configured based on a user's drag and drop operations from a menu of applications into the GUI editor.

15. The article of manufacture of claim 13, wherein the machine accessible medium including content that when accessed by the machine causes the machine to receive a selection of one or more configurations from a menu of configuration options for each selected application comprises machine accessible medium including content that when accessed by the machine causes the machine to display a pop-up window representing a plurality of caller commands and receive a selection of one or more of the plurality of caller commands.

16. The article of manufacture of claim 13, wherein the machine accessible medium including content that when accessed by the machine causes the machine to receive a selection of one or more associations between the selected applications comprises machine accessible medium including content that when accessed by the machine causes the machine to receive a selection of one or more of a plurality of caller commands and a selection of one or more applications to which each selected caller command will be linked by configuration.

17. The article of manufacture of claim 13, wherein the machine-accessible medium farther includes content that causes the machine to run the selected applications in a call processing system to configure the selected applications according to the linked configuration and to display configuration code upon completion of the configuration.

18. The article of manufacture of claim 13, wherein the machine-accessible medium further includes content that causes the machine to receive a request for call statistics for a selected application and display statistics of all calls handled by the selected application.

* * * * *